(12) United States Patent
Chiaverini et al.

(10) Patent No.: US 10,640,424 B2
(45) Date of Patent: May 5, 2020

(54) CASTABLE MATERIAL BASED ON CEMENTITIOUS BINDER WITH SHRINKAGE RESISTANCE

(71) Applicant: CEMEX RESEARCH GROUP AG, Brugg bei Biel (CH)

(72) Inventors: Jessica Chiaverini, Bienne (CH); Wolfgang Salmen, Büren (DE); Alexandre Guerini, Lyss (CH)

(73) Assignee: CEMEX RESEARCH GROUP AG, Brugg bei Biel (CH)

( * ) Notice: Subject to any disclaimer, the term of this patent is extended or adjusted under 35 U.S.C. 154(b) by 51 days.

(21) Appl. No.: 15/751,027

(22) PCT Filed: Aug. 7, 2015

(86) PCT No.: PCT/IB2015/056028
§ 371 (c)(1),
(2) Date: Feb. 7, 2018

(87) PCT Pub. No.: WO2017/025771
PCT Pub. Date: Feb. 16, 2017

(65) Prior Publication Data
US 2018/0230056 A1    Aug. 16, 2018

(51) Int. Cl.
| C04B 28/04 | (2006.01) |
| C04B 14/04 | (2006.01) |
| C04B 14/06 | (2006.01) |
| C04B 24/02 | (2006.01) |
| C04B 24/04 | (2006.01) |
| C04B 24/36 | (2006.01) |
| C04B 24/38 | (2006.01) |
| C04B 111/34 | (2006.01) |
| C04B 103/00 | (2006.01) |
| C04B 103/46 | (2006.01) |

(52) U.S. Cl.
CPC .............. *C04B 28/04* (2013.01); *C04B 14/04* (2013.01); *C04B 14/06* (2013.01); *C04B 24/02* (2013.01); *C04B 24/04* (2013.01); *C04B 24/36* (2013.01); *C04B 24/38* (2013.01); *C04B 2103/0079* (2013.01); *C04B 2103/465* (2013.01); *C04B 2111/34* (2013.01)

(58) Field of Classification Search
CPC ......... C04B 14/04; C04B 14/06; C04B 24/02; C04B 24/04; C04B 24/36; C04B 24/38; C04B 28/04; C04B 2103/465; C04B 2103/0079; C04B 2111/34
See application file for complete search history.

(56) References Cited

U.S. PATENT DOCUMENTS

| 6,468,344 B1 | 10/2002 | Liang et al. |
| 2018/0230053 A1* | 8/2018 | Chiaverini ............. C04B 28/04 |

FOREIGN PATENT DOCUMENTS

DE    3031082 A1    4/1981

OTHER PUBLICATIONS

Database WPI, Week 201259, Thomson Scientific, London, GB; AN 2012-L30527, XP002755835, & JP 2012 162434 (Nippon Shokubai Co. Ltd.) Aug. 30, 2012, abstract.
Madduru, S. R. C., et al., "Paraffin Wax as an Internal Curing Agent in Ordinary Concrete," Magazine of Concrete Research 2015;67(2):82-88.
El-Dieb, A. S., "Self-curing concrete: Water retention, hydration and moisture transport," Construction and Building Materials 2007;21:1282-1287.
Jagannadha Kumar, M. V., et al., "Strength Characteristics of Self-Curing Concrete," IJRET: International Journal of Research in Engineering and Technology 2012;1(1):51-57.
International Search Report for PCT Patent App. No. PCT/IB2015/056028 (dated Apr. 5, 2016).
Written Opinion for PCT Patent App. No. PCT/IB2015/056028 (dated Apr. 5, 2016).

* cited by examiner

*Primary Examiner* — Anthony J Green
(74) *Attorney, Agent, or Firm* — Kenealy Vaidya LLP

(57) ABSTRACT

Some embodiments are directed to a new castable cement based material containing a special admixture based internal curing system to reduce the shrinkage and avoid the formation of cracks, and method of producing the same.

16 Claims, No Drawings

CASTABLE MATERIAL BASED ON CEMENTITIOUS BINDER WITH SHRINKAGE RESISTANCE

CROSS REFERENCE TO RELATED APPLICATIONS

This application is a national phase filing under 35 C.F.R. § 371 of and claims priority to PCT Patent Application No. PCT/IB2015/056028, filed on Aug. 7, 2015, the content of which is hereby incorporated in its entirety by reference.

BACKGROUND

Some embodiments relate to concrete or mortar mix designs containing a special admixture-based internal curing system to reduce the shrinkage (plastic drying and autogenous) and avoid the formation of cracks.

Cracks formation due to shrinkage of concretes during hydration and hardening are a common occurrence in concrete and they can be structural (which endanger the safety and durability of the construction, occurring due to an incorrect mix design, errors during construction and/or over loading) or non-structural (which do not jeopardize the safety of the construction, mostly due to internally induced stresses). Nevertheless, even non-structural cracking should be avoided, since moisture penetration through such cracks may result in corrosion of the structure, resulting in a weaker structure and poor aesthetics.

Thermal changes, wind, chemical reactions or moisture differences, for example, cause internal stress in the concrete structure, leading to dimensional adjustments, for example concrete shrinkage; when the movement for the adjustment is restricted, cracks may form.

SUMMARY

Several types of shrinkage may occur in concrete, namely:

Plastic shrinkage, which is the volumetric contraction that concrete undergoes after being placed, still in fresh (or plastic) state, before setting. If the concrete surface loses bleed water faster than the rate of bleeding, it dries quicker, resulting in a tension that leads to cracks.

Drying shrinkage, caused by the loss of excess water. The chemical reaction that causes concrete to go from a liquid or plastic state into a solid state (hydration) consumes water. To assure the workability of fresh concrete, it is a normal procedure to add to the concrete mix a higher quantity of water than the one strictly needed for the hydration process. This water in excess will not be part of the hydrated product and will escape the network while the product gets stiff, leading to concrete shrinkage. Surface and/or internal restrictions, such as, for example, the reinforcement in use, the formwork, the subgrade, etc., provoke different shrinkage rates and tension stress in different directions, which finally leads to concrete cracking.

Autogenous shrinkage, which occurs at low water to binder ratios, less than about 0.42. At this low water/binder ratio, all the water is rapidly used in the hydration process, creating a water deficit which leads to the appearance of fine capillaries. The surface tension within the capillaries may lead to cracking.

Thermal shrinkage, which is explained on the premise that solids expand on heating and contract on cooling. When free to deform, concrete will expand or contract due to temperature oscillations. If the concrete structure is held in place or restrained, for example, by internal reinforcement, temperature changes may create stress and cause the concrete to crack.

Carbonation shrinkage, which occurs when the concrete is exposed to atmospheric $CO_2$. The $CO_2$ reacts with hydrated cement, namely with $Ca(OH)_2$, which is converted to $CaCO_3$. This reaction, called carbonation, leads to an increase in weight of the concrete and to its shrinkage.

The curing process is an essential step when concrete is placed. The chemical reaction that causes concrete to go from a liquid or plastic state into a solid state (hydration) consumes water. Although the theoretical minimum water content with respect to the quantity of cement is 25% weight, a slight excess is used to improve workability of the product. Nevertheless, excess of water is prejudicial to the final product. Before hardening, the concrete is full of water, which fills in the space between the solid ingredients, making the slab a certain size. As the hydrated cement paste loses moisture from its pores, the slab gets smaller. If an excess of water is used in the mix, the shrinkage will be greater than if the correct amount of water is used. Shrinkage is the main cause of cracking, since it will create forces in the concrete that will drag the slab apart, provoking cracks to happen.

Therefore, a proper curing of the concrete is needed to avoid the rapid drying of the product and consequently to avoid the formation of cracks. Curing avoids water loss and is normally done by spraying or sprinkling water over the concrete surface for days to ensure that the surface is permanently moist or by covering the surface with a water tight film. This prevents the concrete's moisture from evaporating, contributing to the strength gain of the product and prevents the appearance of cracks, yet these operations are time consuming and costly Several factors impact shrinkage, for example: the cement and water content, size of the aggregates, aggregate to cement ratio, excessive fines, admixtures, cement composition, temperature, humidity, curing process, etc.

Particularly, the so called shrinkage-reducing and shrinkage-compensating admixtures have been proven efficient against drying shrinkage. While shrinkage-reducing admixtures are believed to reduce shrinkage by modifying the surface tension of capillary pore water, shrinkage-compensating materials help the concrete to expand at the same volume that drying shrinkage contracts it through specific chemical reactions, the most relevant leading to the formation of ettringite or calcium hydroxide.

Shrinkage-compensating materials and shrinkage-reducing admixtures are already disclosed in the related art. Whilst the first are normally based on calcium sulfo-aluminate or calcium aluminate and calcium oxide, the later are normally based on polyoxyalkylene alkyl ethers or propylene glycol. Also the usage of fibres and superabsorbent polymers (SAPs) have been shown effective against concrete shrinkage, the later also used in high performance concrete mixtures that use low water to binder ratios to prevent autogenous shrinkage.

Various technologies have been used to reduce shrinkage, using chemicals or fibres or mixes thereof. For instance the use of fibres (cellulose fibres, polyethylene fibres, polypropylene fibres, etc.) has been used on the concrete industry since many years.

More recently, combination of shrinkage reducing or shrinkage compensation agent and fibres has been disclosed (WO2011053103). WO '103 discloses mainly the use of fibres and ethylene glycol. Patent EP1911731 discloses a cementitious material containing shrinkage reducers based on all kind of glycols in combination with fluorinated surfactants aiming at reducing the surface tension of the water. U.S. Pat. No. 5,622,558 discloses dry shrinkage reducing admixtures based on mixes of alkylene glycols or water soluble condensed alkylene glycols and silica fume. U.S. Pat. No. 6,468,344 discloses a cementitious mix that contains at least one aggregate including a curing agent that is including polyethylene glycol with molecular weight from 200 to 10,000 or methoxypolyethylene glycols with molecular weight ranking from 350-10,000 and a paraffin wax. The ratio in weight between the glycols and the wax (in dry solid content) are 1:3 to 1:12.

All these systems may negatively impact the rheology and properties of the final hardened concrete and are not proven to be efficient under severe hot and dry conditions to which the placed castable material can be placed (pavement, floors, slabs, etc.). U.S. Pat. No. 6,468,344 for instance does not expose the samples to intensive drying and the results were only evaluated using moisture loses property measurement and strength. In both U.S. Pat. No. 6,468,344 and EP1911731 shrinkage cracking resistance was not demonstrated as the tests were not selected to favor the appearance of cracks (constrained or differential deformation under severe conditions) and mainly performed on cement pastes.

It may therefore be advantageous to address or overcome the problems or challenges with the related art discussed above, and to develop new shrinkage resistant products, covering a wide range of applications in mortars and concrete and a wide range of consistencies (from F2 to SF3).

Some embodiments are directed to a castable cement based material to reduce shrinkage and avoid the formation of cracks, and covering a wide range of applications in mortars and concrete and a wide range of consistencies (from F2 to SF3). To do this, some embodiments are directed to a new internal curing system, avoiding the use of large polymers like PEG or MPEG with very high molecular weights that may interact with superplasticizers admixtures and undergo problems of solubility for instance.

Definitions

As used herein, "Hydraulic binder" refers to a material with cementing properties that sets and hardens due to hydration even under water. Hydraulic binders produce calcium silicate hydrates also known as CSH.

As used herein, "Cement" refers to a binder that sets and hardens and brings materials together. The most common cement is the ordinary Portland cement (OPC) and a series of Portland cements blended with other cementitious materials.

As used herein, "Ordinary Portland cement" refers to a hydraulic cement made from grinding clinker with gypsum. Portland cement contains calcium silicate, calcium aluminate and calcium ferroaluminate phases. These mineral phases react with water to produce strength.

As used herein "Portland clinker" refers to the basic component of cement produced by the clinker manufacturing kiln, without any addition of gypsum, limestone or any other cementitious materials. As used herein, "Mineral addition" refers to a mineral admixture (including the following powders: silica fume, fly ash, slags) added to concrete to enhance fresh properties, compressive strength development and improve durability.

As used herein, "Silica fume" refers to a source of amorphous silicon obtained as a byproduct of the silicon and ferrosilicon alloy production. Also known as microsilica.

As used herein, "Total binder" refers to the sum of all cementitious components (cement, fly ash, slag, silica fume, etc.) in weight.

As used herein, "Volume of paste" refers to the total volume of the cement, +fly ash+slag+silica fume+filler (micro-silica or micro-limestone)+water+entrained air (following densities in Kg/Liter are used: cement type I 3.15 type II 3.0, fly ash: 2.1, Ground Granulated Blast Furnace Slag: 2.15, fillers 2.8, silica fume: 0.5, water: 1).

As used herein, "Fibers" refers to a material used to increase concrete's structural performance. For example, fibers include: steel fibers, glass fibers, synthetic fibers and natural fibers.

As used herein, "Alumino silicate—by-product (Fly Ash—bottom ash)" refers to an alkali reactive binder components that together with the activator form the cementitious paste. These are minerals rich in alumina and silica in both, amorphous and crystalline structure.

As used herein, "Natural pozzolan" refers to an aluminosilicate material of volcanic origin that reacts with calcium hydroxide to produce calcium silicate hydrates or CSH as known in Portland cement hydration.

As used herein, "Inert filler" refers to a material that does alter physical properties of concrete but does not take place in hydration reaction.

As used herein, "Admixture raw material" refers to a chemical component in an admixture formulation system of one main chemical polymer.

As used herein, "Admixture" refers to a chemical admixture used to modify or improve concrete's properties in fresh and hardened state. These could be air entrainers, water reducers, set retarders, accelerators, stabilizers, superplasticizers and others.

As used herein, "Air entrained" refers to the total volume of air entrained in the concrete by the air entrainer.

As used herein, "PCE" refers to polycarboxylic Acid Co-Polymers used as a class of cement and concrete admixtures, and are comb type polymers that are based on: a polymer backbone made of acrylic, methacrylic, maleic acid, and related monomers, which is grafted with polyoxyalkylene side-chain such as EO and/or PO. The grafting could be, but is not limited to, ester, ether, amide or imide.

As used herein, "Initial dispersant" refers to a chemical admixture used in hydraulic cement compositions such as Portland cement concrete, part of the plasticizer and superplasticizer family, which allow a good dispersion of cement particles during the initial hydration stage.

As used herein, "Superplasticizers" refers to a class of chemical admixture used in hydraulic cement compositions such as Portland cement concrete having the ability to highly reduce the water demand while maintaining a good dispersion of cement particles. In particular, superplasticizers avoid particle aggregation and improve the rheological properties and workability of cement and concrete at the different stage of the hydration reaction.

As used herein, "Concrete" refers to a combination of hydraulic binder, sand, fine and/or coarse aggregates, water. Admixture can also be added to provide specific properties such as flow, lower water content, acceleration . . . .

As used herein, "Castable construction materials" refers to a material which fluidity (with our without vibration) allows to full fill a formwork or to be collocate in a definite surface.

As used herein, "Construction materials" refers to any materials that can be use to build construction element or structure. It includes concrete, masonries (bricks—blocks), stone, ICF . . . .

As used herein, "Structural applications" refers to a construction material having a compressive strength greater than 25 MPa As used herein, "Workability" refers to the workability of a material which is measured with a slump test (see table 1: slump)

As used herein, "Workability retention" refers to the capability of a mix to maintain its workability during the time. The total time required depends on the application and the transportation.

As used herein, "Internal Curing admixture" refers to an admixture agent that retains water and release the eater internally in a delayed matter to compensated form water depletion due to drying As used herein, "Strength development—setting/hardening" refers to the setting time start when the construction material change from plastic to rigid. In the rigid stage the material cannot be poured or moved anymore. After this phase the strength development corresponding to the hardening of the material As used herein, "Coarse aggregates" refers to a manufactured, natural or recycled mineral with a particle size greater than 6 mm and a maximum size lower than 32 mm (typically 8-16 mm, 8-25 mm, 10-32 mm, 6-16 mm, etc.).

As used herein, "Fines aggregates" refers to a manufactured, natural or recycled minerals with a particle size typically greater than 3 mm and a maximum size lower than 10 mm (typically 4-8 mm, 2-8 mm, 3-10 mm, etc.).

As used herein, "Sand aggregates" refers to a manufactured, natural or recycled minerals with a particle size lower than 3 or 4 mm As used herein, "Shrinkage" refers to the reduction in the volume of concrete caused by the loss of moisture as concrete hardens or dries. Because of the volume loss, concrete shrinkage can lead, for example, to cracking when base friction or other restraint occurs.

As used herein, the water to binder ratio "w/b" refers to the total free water (w) mass in Kg divided by the total binder mass in Kg As used herein, "Shrinkage reducing admixtures" refers to products aimed at reducing the amount of shrinkage that occurs in concrete.

As used herein, "Superabsorbents" refers to polymeric materials that have the ability to absorb a large amount of liquid from the surroundings and retain it within their structure. They can ensure internal curing very efficiently.

TABLE 1

Consistency of concrete from European Norm
(slump tests according to EN 12350-2).
EN 206 2013 (§ 4.2 - table 3)

| Consistency | slump [mm] |
| --- | --- |
| S1 | 10 to 40 |
| S2 | 40 to 90 |
| S3 | 100 to 150 |
| S4 | 160 to 210 |
| S5 | >220 |

TABLE 2

Consistency of fluid concrete from European Norm
(slump tests according to EN 12350-2)
EN 206 2013 (§ 4.2.1 table 6)

| category | Flow [mm] |
| --- | --- |
| SF1 | 550-650 |
| SF2 | 660-750 |
| SF3 | 760-850 |

Some embodiments focus on a technical solution to produce concrete or mortar mix designs (also named castable cement based material) in order to substantially reduce the risk of cracking related to plastic shrinkage and drying shrinkage, specifically for application in mortars and concrete in dry and/or hot environment (pavement, decorative concrete or mortars, slabs, large industrial floors, architectonic concrete facades, screeds, etc.).

Applications require fluid yet very stable concrete or mortars design to optimize self placing properties (e.g. screed, slabs, pavements, etc.). One major disadvantage that some embodiments address or solve is the risk of drastic fluidity increase of the mortars or concretes related to the use of related art shrinkage reducing agents, leading to important risks of segregation if the stability of the concrete or mortar is not balance by a substantial adjustment of the yield stress.

More specifically, some embodiments are directed to a concrete or mortar mix design that includes an internal curing system that includes the combination of at least 2 main constituents to provide a combined effect to reduce the shrinkage (plastic and drying shrinkage) acting on the mobility of water in the concrete or mortars while providing fresh rheological properties that can vary from S2 to SF3 without risk of segregation.

The internal curing admixture system uses at least a first component A that is a wax emulsion, and a second component B that is a shrinkage reducing agent, preferably a glycol-based shrinkage reducing agent.

Alternatively, the internal curing system may further include a component C that is a water retention agent and/or a further component D that is a rheology modifier.

All internal curing agent components are added together in an admixture or separately from each other to the concrete or the mortar before, during or after mixing of the other components (water, cement, mineral or pozzolanic additions, sand, fine and/or coarse aggregates, other admixtures like water reduction agents, superplastifyers, accelerators, retarders, air entrainers, air reducers, pigments, fibers, etc.).

According to a first possible or preferred embodiment, the components A, B and optionally C are added separately from each other (e.g. from respective different containers and storages) in liquid form and mixed with the other concrete or mortars constituents. A further component D may be added in the same way.

According to a second embodiment, the components A, B and D are formulated as one admixture and the admixture is mixed with the other concrete or mortars constituents. A further component C may be added to the admixture.

Possibly or preferably, the component A is a paraffin wax emulsion of paraffin combined with polyether synthetic waxes (for instance Trecycen form the Company Truebchemie, or Sasolwax 6403 Sasolwax 6070 from the company Sasol Wax GmbH) and an emulsifier agent that can be ionic, ionic or cationic. Advantageously, the combination between paraffin and polyether synthetic waxes may be arranged so that the melting point of the wax emulsion is above 40° C., more specifically between 42 and 55° C.

Possibly or preferably, the component A is a solution containing 30-60 weight % of paraffin and polyester waxes (dry solid contents), 2-6 weight % of emulsion (dry solid content) and 40-70 weight % of water.

One purpose of the component A is to act as a sealing agent, reducing or avoiding water loss due to dying of the concrete or mortar by forming diffusion or evaporation films inside and at the surface of the concrete or mortar.

Possibly or preferably, the component B of the internal curing system is a shrinkage reducing agent. The shrinkage reducing agent reduces the surface tension on the capillarity pores, reducing the mobility of water and this preventing dramatic dry shrinkage and related produce cracks.

Possibly or preferably, the component B of the internal curing system is a glycol-based chemical, for instance hexylene glycol, dipolypropylene glycol, diethylene glycol or a mixture of two or more thereof.

The optional component C of the internal curing system is a water retention agent that prevents or reduces the rapid loss of water for surfaces exposed to dry conditions.

Typically water retention agent C may be chosen from viscosity modifiers (also called rheology modifiers). Organic rheology modifiers include polysaccharides, xanthan gum, alginates, cellulose, and guar gum. Inorganic rheology modifiers include smectite clays and amorphous silicon dioxide. Other examples of synthetically derived rheology modifiers include polymers of acrylic acid and co-polymers thereof, polyethylene and related copolymers (for example, ethylene-vinyl acetate copolymer) alkylene oxide polymers and esters thereof (for example Poly(ethylene glycol) ester) and methyl vinyl ether/maleic anhydride copolymers cross-linked with decadiene.

Possibly or preferably, the component C is a polysaccharide (cellulose, starch, cellulose, alginate, egg yolk, agar, arrowroot, carageenan, collagen, gelatin, guar gum, welan gum, gellan gum, diutan gum, pullulan pectin and xanthan gum).

The main effect of the component C in the internal curing system is to retain water and limit the evaporation from concrete, and hence increase the water retention capacity of the concrete, and or to modify the rheology.

The optional component D of the internal curing system is a rheology modifier.

Possibly or preferably, the component D is an acrylic acid polymer that provides homogeneity and stability of the formulated admixture to reduce risk of segregation and separation of the ingredients and increase the shelf life for storage or a polysaccharide (cellulose, starch, cellulose, alginate, welan gum, diutan gum, xanthan gum, etc . . . ).

According to the first possible or preferred embodiment, the components of the internal curing admixture system are added separately to a mix of binder containing mainly Portland cement and optionally mineral additions, sand, water, and optionally fine and/or coarse aggregates.

The mix may also contain water reducers, plasticizers or superplasticizers, accelerators, retarders, air entrainers, defoamers or any other admixtures, structural fiber reinforcement (metal, mineral, carbon, inorganic) or organic fibers, etc.

Possibly or preferably, the mix produced (concrete or mortar) contains a total binder content located between 290 Kg/m$^3$ and 800 Kg/m$^3$ with reference to the concrete or the mortar, the total binder contains at least 40% Portland Clinker in weight.

Ranges for w/b (water/binder) ratio are located between 0.25 and 0.7. Typically, high values of w/b ratio (above 0.4) are used for screeds and mortars, whereas concrete formulations may have w/b ratio between 0.25 and 0.55.

Advantageously, the average amount of sand is typically between 500 Kg and 1600 Kg per cubic meter of fresh produced castable material.

Advantageously, the average amount of fine aggregates (when used) is typically between 200 Kg and 1000 Kg, and the average quantity of coarse aggregates (when used) is typically between 250 Kg and 900 Kg, per cubic meter of fresh produced castable material.

In the possible or preferred first embodiment, the 2 components A, and B of the internal curing system are respectively used in concrete and mortar applications with the following dosage expressed in dry solid content ranges in weight % of the total binder.

Component A (wax emulsion): 0.04 weight % to 1.35 weight %.

Higher dosages in wax will start to affect the strength development (reducing final strength) and lower dosages will have no substantial effect on the internal curing.

Component B (shrinkage reducer): 0.1 weight % to 3 weight %.

Higher dosages in shrinkage reducer will start to affect the strength development (reducing final strength) as well as the setting time (extended) and lower dosages will have no substantial effect on the internal curing.

The concentration of the optional component C is typically located in the following range: Component C (water retention agent): 0.0025 weight % to 0.20 weight %.

Higher dosages in components C will start to substantially affect the consistency of the castable material prepared and lower values will have too limited complementary effect on the water retention.

The concentration of the optional component D is typically located in the following range:

Component D (rheology modifier acrylic acid) 0.000075 weight % to 0.01 weight %

Component D (rheology modifier polysaccharide 0.0005 weight % to 0.02 weight %

Higher dosages may affect the consistency of the castable cement based material and will affect the setting time.

According to the second possible or preferred embodiment, some embodiments are directed to castable material based on cement binders (mortars or concrete) containing at least a binder, optionally mineral additions sand, water optionally fine and/or coarse aggregates and a formulated admixture that contains all the ingredients of the internal curing system The castable mix may also contain water reducers, plasticizers or superplasticizers, accelerators, retarders, air entrainers, defoamers or any other admixtures as well as structural fiber reinforcement (metal, mineral, carbon, inorganic) or organic fibers, etc.

In this second embodiment, the internal curing system is available as formulated stable admixtures, containing at least the following components: A (wax emulsion), B (glycol-based shrinkage reducing agent) and D (rheology modifier), with water, and optionally a component C (water retention agent).

The formulated product contains a first component A. Possibly or preferably, the component A is a paraffin wax emulsion combined with polyether synthetic waxes and an emulsifier agent. Advantageously, the combination between paraffin and polyester synthetic waxes may be arranged so the melting of the wax is above 40° C., more specifically between 45 and 55° C.

In this second embodiment, the wax emulsion (component A) may be first treated with $NH_3$ in order to neutralize the anionic nature of the wax in the emulsion or/and obtain a cationic charged wax in the emulsion; the pH of the wax emulsion in this preferred second embodiment is advantageously located between 9-11.

The formulated product contains a second component B that is a glycol-based shrinkage reducing agent (hexylene glycol, dipolypropylene glycol, diethylene glycol, or mixture of two or more thereof).

The formulated product contains also a third component D (rheology modifier) that is typically chosen from synthetically derived rheology modifiers which include polymers of acrylic acid and co-polymers thereof, polyethylene and related copolymers (for example, ethylene-vinyl acetate copolymer) alkylene oxide polymers and esters thereof (for example Poly(ethylene glycol) ester) and methyl vinyl ether/ maleic anhydride copolymers crosslinked with decadiene or polysaccharides (cellulose, starch, cellulose, alginate, egg yolk, agar, arrowroot, carageenan, collagen, gelatin, guar gum, welan gum, gellan gum, diutan gum, pullulan pectin and xanthan gum, etc.).

The formulated product containing the internal curing system also contains water.

Advantageously, the component D of the formulated internal curing system is an acrylic acid polymer that provides homogeneity and stability of the formulated admixture to reduce risk of segregation and separation of the ingredients and increase the shelf life for storage or a polysaccharide (cellulose, starch, cellulose, alginate, welan gum, diutan gum, xanthan gum, etc.)

Optionally, the formulated product may also contain a further component C (a water retention agent) that is a polysaccharide.

In the possible or preferred second embodiment, the components of the internal curing admixture system are added as a formulated liquid admixture containing all components of the internal curing system to a mix of binder containing mainly Portland cement and optionally mineral additions, sand, water, and optionally fine and/or coarse aggregates.

The castable mix main also contain water reducers, plasticizers or superplasticizers, accelerators, retarders, air entrainers, defoamers or any other admixtures.

Possibly or preferably, the castable mix contains a total binder amount located between 290 $Kg/m^3$ and 800 $Kg/m^3$ of fresh produced castable material (e.g. concrete or mortar). Preferably, the total binder contains at least 50% Portland Clinker in weight.

Ranges for w/b (water/binder ratio) are located between 0.25 and 0.7. Typically high values of w/b ratio (above 0.4) are used for screeds and mortars, whereas concrete mix designs may have w/b ratio located between 0.25 and 0.55.

The average amount of sand is typically located between 500 Kg and 1600 Kg per cubic meter of fresh produced castable material.

Advantageously, the average amount of fine aggregates (when used) is typically located between 200 Kg and 1000 Kg, and the average quantity of coarse aggregates (when used) is typically located between 250 Kg and 900 Kg, per cubic meter of fresh produced castable material.

In the Formulated Admixture

Advantageously, the various components of the formulated admixture system are dosed in a water based liquid admixture where the solid dry content of the ingredients with respect to water is located between 35% and 80% by weight, preferably between 45% and 75% by weight and more preferably between 50% and 70% by weight, to limit the quantity of water and the corresponding transportation costs and the formulated product. Higher dosages will lead to instability of the formulated admixture that will tend to segregate rapidly.

Advantageously the dry solid content ratio between components A and component B in weight is typically located between 0.2 and 1.0.

Exceeding the NB dry solid content ratio above 1.0 presents no further advantage in terms of internal curing and may affect strength development depending on the dosage of the formulated product in the concrete or mortar and will yield instability of the formulated admixture.

The dosage of the component D (dry solid content) in weight of the total admixture containing the water and all components (of the internal curing agent admixture) is located between 0.015 weight % and 0.2 weight %, if based on acrylic acid polymer, or between 0.1 weight % and 0.4 weight % if based on polysaccharides (e.g. Xanthan Gum).

The dosage of the optional component C (dry solid content) in weight of the total formulated admixture product containing the water and all components is located between 0.05 weight % and 1.5 weight %.

The dosage is also expressed with respect to the volume of cement paste in grams/liter of paste as will be showed in the examples.

In the Mix Design (Castable Cement-Based Material)

In the possible or preferred second embodiment, the 3 components A, and B and D of the internal curing system are respectively used in concrete and mortar applications with the following dosage expressed in dry solid content ranges in weight % of the total binder.

Component A (wax emulsion): 0.04 weight % to 1.35 weight %

Component B (shrinkage reducer): 0.1 weight % to 3 weight %

Component D1 (rheology modifier acrylic acid) 0.000075 weight % to 0.01 weight %

Component D1 (rheology modifier polysaccharide 0.0005 weight % to 0.02 weight %

Advantageously, in the possible or preferred second embodiment, the amount of the optional component C is typically located in the following range (expressed in dry solid content ranges in weight % of the total binder):

Component C (water retention agent): 0.0025 weight % to 0.20 weight %.

The formulated admixture according to the preferred second embodiment of the presently disclosed subject matter can be prepared in conventional admixture mixing plants.

Advantageously, the sequence of mixing has the following characteristics:

1. the water and the rheology modifier D are first mixed together for a duration T1, then the wax emulsion (component A) is added and mixed with the pre-mix of water and the rheology modifier D for a duration T2, then the component B (glycol-based shrinkage reducing agent) is added to the pre-mix of water, D and A and mixed for a duration T3. Optionally, the component C can be added in the beginning of duration T1, after the component D has been added to the water.

Possibly or preferably, to provide the best product stability and enhance the time during which the product can be stored without segregation, the various durations are the following:

T1 from 45 minutes to 100 minutes
T2 from 15 minutes to 45 minutes
T3 from 15 to 45 minutes The mixing duration T1 is the most important duration that needs to be respected to allow the formulation to be homogenous and stable. Instability will yield separation of the constituents (segregation) and the admixture will no longer used to risk of dosage errors.

EXAMPLES

Examples 1-10 are provided for concrete screed and mortar according to the first and second embodiment of the presently disclosed subject matter and mortars (respectively using the components of the internal curing system separately or formulated in an admixture).

In the hot box, two heating fans were used to produce a temperature of about 40° C. and a air speed of about 5 m/sec on the top surface of the molds placed inside.

After 24 h from initial mixing, the area of the cracks that form on the surface was registered. The length and the width of the cracks were measured to calculate the area of the cracks.

Instead of registering the area of the cracks, the minimum and maximum width of the central crack can be measured, which provides a range of the width appeared on the surface of the mortar/concrete.

Comparison of the modified crack test with the norm is shown in Table 3:

TABLE 3 description of the modified crack test used to characterize the resistance to shrinkage and the effect of the internal curing system.

|  | ASTM C1579 | Modified crack test |
| --- | --- | --- |
| Use | Fiber reinforced concrete (FRC) | All types of mortar and concrete |
| Dimension of the test panels | 2 times 56 × 35.5 × 10 cm | 3 times 38 × 24 × 7 cm or 1 time 77 × 44 × 7 cm |
| Big stress height | 6.35 cm | 4.50 cm |
| Hot box | Monitor systems of evaporation rate, air flow, setting time | No monitor systems |
|  | Hot box for 2 panels test | Hot box for 3 panels test |
| Temperature | 36° C. | 42° C. |
| Relative Humidity | 30% | 10% |
| Wind velocity | to have an evaporation rate of 1.0 Kg/m2 × h | 5-7 m/s |
| Procedure | Test stops at the final setting time and the panels test are stored until 24 h at 20° C. under plastic sheets. | Test stops at 24 h. |
| Results | Cracking reduction ratio (CRR) at 24 h: (1 − ((average crack width of FRC mix)/ (average crack width of control mix))) × 100 | Width range of cracking at 24 h |

The cements used are of type Portland cement type I, II (EN Norms). Sand, fine size aggregates and large size aggregates are either round or crushed.

Mortars have been mixed using standard EN Mortar mixers and concrete samples have been mixed using conventional concrete mixers with capacity from 10 liters to 1 cubic meter.

Flow measurements were performed on cone test and standard spread metallic plate. Strength measurements on mortars were done on 4×4×16 cm standard samples and concrete samples are tested on cubes (15×15×15 cm) or cylinders (diam. 15 cm height 30 cm).

The self curing behavior or the shrinkage resistance was measured using cracking tests.

The crack test carried out in the examples that follow was a modification of the norm ASTM C1579-2006 and is shown in table 3.

The crack test is an evaluation of the plastic shrinkage of mortar or concrete in severe conditions of curing: high temperature (about 40° C.) and dry environment (11-15% RH) and forced strong ventilation (about 5 m/sec).

The test was done by casting a concrete or a mortar in a 38 cm×24 cm×7 in a mold and placing the mold in a wood hot box (environmental chamber) for 24 hours. A stress riser, made of steel, with internal restraint was placed at the bottom of the mold.

Before placing the molds in the hot box, a surface finishing has to be made, normally by a trowel or a metal straightedge.

The ring test is t is a modification of the standard ring test: ASTM C1581-04.

This method determines the age of cracking and induced tensile stress characteristics of mortar and concrete specimens under restrained shrinkage.

A sample of freshly mixed mortar or concrete is compacted in a circular mold around a steel ring. The restrained shrinkage behavior of concrete or mortar from the time of demolding is monitored continuously by a system of strain gauges that measures the deformation of the material in time. Cracking of the test specimen is indicated by a sudden variation of the displacement value recorded by the strain gauges.

The age at cracking indicates the materials resistance to cracking under restrained shrinkage.

The test enables a measurement of the material deformation coupled with cracking behavior. The apparatus used I a steel mold consisting in a steel base, an inner steel ring and an outer ring (composed of 2 parts).

For mortar: Mold: 16 mm thickness Inner ring: 106 mm internal diameter; 130 mm external diameter; 67 mm height
Steel base: 82 mm internal diameter; 162 mm external diameter; 20 mm height Outer ring: 162 mm internal diameter; 87 mm height For concrete:
Mold: 40 mm thickness
Inner ring: 294.6 mm internal diameter; 320.1 mm external diameter; 165 mm height
Steel base: 400.1 mm internal diameter; 460 mm external diameter; 15 mm height Outer ring: 400 mm internal diameter; 165 mm height Procedure used:
- Oil the surface of the molds and cast the material into them.
- At the time of demolding, remove the two parts of the outer ring and the mold base from the concrete or mortar ring.
- Seal the bottom of the ring with paraffin wax or an adhesive aluminum foil tape.
- Place the ring in a flat support and glue the gauges (2-3).
- Seal the top with the same sealing agent use for the bottom. This operation allows having the drying of the material only from the external surface of the ring.
- Start the record of the gauges (one measurement every 5-30 minutes)
- A sudden decrease in the displacement measurement indicates cracking. The sudden decrease is usually about 10 microns of displacement for mortar specimen and about 2-6 microns of displacement for concrete specimen.

The text is stopped at 28 days if no cracks were detected.

Examples are provided with various content of binders and various dosages of the components of the internal curing system and various type and contents of aggregates. For each example provided, the same mix design yet containing no internal curing system was also tested to have a reference for each of the examples.

The examples show typical mix designs to build exposed castable cement based material (pavements, walls, slabs, façades, floors, etc.).

Example 1: Mortar Formulation with and without Internal Curing System (System (Components A and B Added Separately from Each Other to the Castable Cement Based Material)

| | | EXAMPLE 1 | | |
|---|---|---|---|---|
| Material | Unit | Reference 1-1 | Example 1-1 | Example 1-2 |
| Cement | kg/m$^3$ of castable material | 450 | 450 | 450 |
| Cement Type | — | Type I | Type I | Type I |
| Fly ash content | kg/m$^3$ of castable material | 0 | 0 | 0 |
| Total binder content | kg/m$^3$ of castable material | 450 | 450 | 450 |
| Total water | kg/m$^3$ of castable material | 225 | 201 | 201 |
| w/b | Kg/Kg of total binder per m$^3$ of castable material | 0.5 | 0.45 | 045 |
| Volume of paste | Liters/m$^3$ of castable material | 367 | 343 | 343 |
| Plasticizers/superplasticizers | Weight % solid dry content of the total binder content | 1.1 | 1.3 | 1.3 |
| Other | Weight % solid dry content of the total binder content | 0 | 0 | 0 |
| A paraffin based wax emulsion | Weight % solid dry content, of the total binder content | 0 | 0.4 | 0.35 |
| B Glycol based component | Weight % solid dry content of the total binder content | 0 | 0.8 | 0.53 |
| B Glycol type | — | — | Hexylene | Hexylene |
| C water retention component | Weight % solid dry content, of the total binder content | 0 | 0 | 0 |
| Water retention type | — | — | — | — |
| D rheology modifier | Weight % solid dry content, of the total binder content | 0 | 0 | 0 |
| D rheology modifier type | — | — | — | — |
| Sand | kg/m$^3$ of castable material | 1350 | 1350 | 1350 |
| Fine aggregates gravel 4/8 round | kg/m$^3$ of castable material | 0 | 0 | 0 |
| Coarse aggregates gravel 8/16 round | kg/m$^3$ of castable material | 0 | 0 | 0 |
| | | Results | | |
| Measurement | Unit | Value | Value | value |
| Slump flow | mm | 160 | 160 | 160 |
| Strength at 28 days | mm | — | — | |
| Restrained shrinkage Ring (time of crack) | hours | 16 | 41 | 30 |

Example 2: Concrete Formulation with and without Internal Curing System (Components A and B Added Separately from Each Other to the Castable Cement Based Material)

| EXAMPLE 2 | | | |
|---|---|---|---|
| Material | Unit | Reference 2-1 | Example 2-1 |
| Cement | kg/m³ of castable material | 350 | 350 |
| Cement Type | — | Type II | Type II |
| Fly ash content | kg/m³ of castable material | 0 | 0 |
| Total binder content | kg/m³ of castable material | 350 | 350 |
| Total water | kg/m³ of castable material | 191 | 191 |
| w/b | Kg/Kg of total binder per m3 of castable material | 0.5 | 0.5 |
| Volume of paste | Liters/m³ of castable material | 307 | 307 |
| Plasticizers/superplasticizers | Weight % solid dry content of the total binder content | 0.8 | 0.8 |
| A paraffin based wax emulsion | Weight % solid dry content, of the total binder content | 0 | 0.08 |
| B Glycol based component | Weight % solid dry content of the total binder content | 0 | 0.28 |
| B Glycol type | — | — | Hexylene |
| C water retention component | Weight % solid dry content, of the total binder content | 0 | 0 |
| Water retention type | — | — | — |
| D rheology modifier | Weight % solid dry content, of the total binder content | 0 | 0 |
| D rheology modifier type | — | — | — |
| Sand | kg/m³ of castable material | 1120 | 1120 |
| Fine aggregates gravel 4/8 round | kg/m³ of castable material | 448 | 448 |
| Coarse aggregates gravel 8/16 round | kg/m³ of castable material | 672 | 672 |
| Results | | | |
| Measurement | Unit | Value | Value |
| Slump Flow/Class | Mm/— | 550/SF1 | 620/SF1 |
| Strength at 28 days | mm | 64 | 63.5 |
| Restrained shrinkage Ring (time of crack) | hours | 174 | >600 |

Example 3: Concrete Formulation with and without Internal Curing System (Components A and B Added Separately from Each Other to the Castable Cement Based Material)

| EXAMPLE 3 | | | |
|---|---|---|---|
| Material | Unit | Reference 3-1 | Example 3-1 |
| Cement | kg/m³ of castable material | 450 | 450 |
| Cement Type | — | Type I | Type I |
| Fly ash content | kg/m³ of castable material | 0 | 0 |
| Total binder content | kg/m³ of castable material | 450 | 450 |
| Total water | kg/m³ of castable material | 225 | 200 |
| w/b | Kg/Kg of total binder per m³ of castable material | 0.5 | 0.44 |
| Volume of paste | Liters/m³ of castable material | 367 | 343 |
| Plasticizers/superplasticizers | Weight % solid dry content of the total binder content | 1.1 | 1.75 |
| A paraffin based wax emulsion | Weight % solid dry content, of the total binder content | 0 | 0.55 |
| B Glycol based component | Weight % solid dry content of the total binder content | 0 | 0.6 |
| B Glycol type | — | — | Hexylene |
| C water retention component | Weight % solid dry content, of the total binder content | 0 | 0.07 |
| Water retention type | — | — | polysaccharide |
| D rheology modifier | Weight % solid dry content, of the total binder content | 0 | 0 |

-continued

| EXAMPLE 3 | | | |
|---|---|---|---|
| D rheology modifier type | — | — | — |
| Sand | kg/m³ of castable material | 1350 | 1350 |
| Fine aggregates gravel 4/8 round | kg/m³ of castable material | 0 | 0 |
| Coarse aggregates gravel 8/16 round | kg/m³ of castable material | 0 | 0 |

| Results | | | |
|---|---|---|---|
| Measurement | Unit | Value | Value |
| Slump Flow | mm | 160 | 160 |
| Restrained shrinkage Ring (time of crack) | hours | 16 | 49 |

Example 4: Screed Formulation with and without Internal Curing System (Components A and B Added Separately from Each Other to the Castable Cement Based Material)

| EXAMPLE 4 | | | |
|---|---|---|---|
| Material | Unit | Reference 4-1 | Example 4-1 |
| Cement | kg/m³ of castable material | 500 | 500 |
| Cement Type | — | Type II | Type II |
| Fly ash content | kg/m³ of castable material | 300 | 300 |
| Total binder content | kg/m³ of castable material | 800 | 800 |
| Total water | kg/m³ of castable material | 320 | 320 |
| w/b | Kg/Kg of total binder per m³ of castable material | 0.4 | 0.4 |
| Volume of paste | Liters/m³ of castable material | 637 | 637 |
| Plasticizers/superplasticizers | Weight % solid dry content of the total binder content | 0.5 | 0.5 |
| A paraffin based wax emulsion | Weight % solid dry content, of the total binder content | 0 | 0.4 |
| B Glycol based component | Weight % solid dry content of the total binder content | 0 | 1.39 |
| B Glycol type | — | — | Hexylene |
| C water retention component | Weight % solid dry content, of the total binder content | 0 | 0.2 |
| Water retention type | — | — | polysaccharide |
| D rheology modifier | Weight % solid dry content, of the total binder content | 0 | 0 |
| D rheology modifier type | — | — | — |
| Sand | kg/m³ of castable material | 1140 | 1140 |
| Fine aggregates gravel 4/8 round | kg/m³ of castable material | 0 | 0 |
| Coarse aggregates gravel 8/16 round | kg/m³ of castable material | 0 | 0 |

| Results | | | |
|---|---|---|---|
| Measurement | Unit | Value | Value |
| Restrained shrinkage Ring (time of crack) | days | 3 | >28 |
| Plastic shrinkage crack test | Presence of cracks/crack width (mm) | Yes/1.8 | No |

Example 5: Concrete Formulation with and without Internal Curing System (Components A and B Added Separately from Each Other to the Castable Cement Based Material)

| EXAMPLE 5 | | | |
|---|---|---|---|
| Material | Unit | Reference 5-1 | Example 5-1 |
| Cement | kg/m³ of castable material | 310 | 310 |
| Cement Type | — | Type II | Type II |
| Fly ash content | kg/m³ of castable material | 80 | 80 |
| Total binder content | kg/m³ of castable material | 390 | 390 |
| Total water | kg/m³ of castable material | 183 | 183 |
| w/b | Kg/Kg of total binder per m³ of castable material | 0.47 | 0.47 |
| Volume of paste | Liters/m³ of castable material | 326 | 326 |
| Plasticizers/superplasticizers | Weight % solid dry content of the total binder content | 0.53 | 0.53 |
| A paraffin based wax emulsion | Weight % solid dry content, of the total binder content | 0 | 0.39 |
| B Glycol based component | Weight % solid dry content of the total binder content | 0 | 1.39 |
| B Glycol type | — | — | Hexylene |
| C water retention component | Weight % solid dry content, of the total binder content | 0 | 0.02 |
| Water retention type | — | — | polysaccharide |
| D rheology modifier | Weight % solid dry content, of the total binder content | 0 | 0 |
| D rheology modifier type | — | — | — |
| Sand | kg/m³ of castable material | 781 | 781 |
| Fine aggregates gravel 4/8 round | kg/m³ of castable material | 375 | 375 |
| Coarse aggregates gravel 8/16 round | kg/m³ of castable material | 720 | 720 |
| Results | | | |
| Measurement | Unit | Value | Value |
| Restrained shrinkage Ring (time of crack) | hours | 7 | 49 |
| Plastic shrinkage crack test | Presence of cracks/crack width (mm) | YES/2 | YES/0.2 |

Example 6: Screed Formulation with and without Internal Curing System in a Formulated Admixture (Component A, B and D Added Jointly)

| EXAMPLE 6 | | | | |
|---|---|---|---|---|
| Material | Unit | Reference 6-1 | Example 6-1 | Example 6-2 |
| Cement | kg/m³ of castable material | 375 | 375 | 375 |
| Cement Type | — | CEM I | CEM I | CEM I |
| Fly ash content | kg/m³ of castable material | 0 | 0 | 0 |
| Total binder | kg/m³ of castable material | 375 | 375 | 375 |
| Total water | kg/m³ of castable material | 182 | 182 | 182 |
| w/b | Kg/Kg of total binder per m³ of castable material | 0.48 | 0.48 | 0.48 |
| Volume of paste | Liters/m³ of castable material | 301 | 301 | 301 |
| Plasticizers/superplasticizers | Weight % solid dry content of the total binder content | 2.15 | 2.15 | 2.15 |
| A paraffin based wax emulsion | Weight % solid dry content, of the total binder content | 0 | 0.195 | 0.325 |
| B Glycol based component | Weight % solid dry content of the total binder content | 0 | 0.7 | 1.16 |
| B Glycol type | — | — | Hexylene | Hexylene |
| C water retention component | Weight % solid dry content, of the total binder content | 0 | 0.009 | 0.015 |
| Water retention type | — | — | Polysaccharide | Polysaccharide |
| D rheology modifier | Weight % solid dry content, of the total binder content | 0 | 0.00040% | 0.0007% |
| D rheology modifier type | — | — | acrylic acid | acrylic acid |
| Sand | kg/m³ of castable material | 1050 | 1050 | 1050 |

EXAMPLE 6 (-continued)

| | | | | |
|---|---|---|---|---|
| Fine aggregates gravel 4/12.5 round | kg/m³ of castable material | 729 | 729 | 729 |
| Coarse aggregates gravel 8/16 round | kg/m³ of castable material | 0 | 0 | 0 |

Results

| Measurement | Unit | Value | Value | value |
|---|---|---|---|---|
| Slump flow | mm | 240 | 220 | 230 |
| Strength at 28 days | Mpa | 29.67 | 27.35 | 23.83 |
| Plastic shrinkage cracks/width in mm | —/mm | YES/2 | YES/0.2 | NO/— |

Example 7: Screed Formulation with and without Internal Curing System in a Formulated Admixture (Component A, B and D Added Jointly)

EXAMPLE 7

| Material | Unit | Reference 7-1 | Example 7-1 |
|---|---|---|---|
| Cement | kg/m³ of castable material | 300 | 300 |
| Cement Type | — | Type II | Type II |
| Fly ash content | kg/m³ of castable material | 230 | 230 |
| Total binder | kg/m³ of castable material | 530 | 530 |
| Total water | kg/m³ of castable material | 191 | 191 |
| w/b | Kg/Kg of total binder per m³ of castable material | 0.36 | 0.36 |
| Volume of paste | Liters/m³ of castable material | 406 | 406 |
| Polypropylene fibers | Weight % solid dry content of the total binder content | 0.17 | 0.17 |
| Plasticizers/superplasticizers | Weight % solid dry content of the total binder content | 0.62 | 0.7 |
| A paraffin based wax emulsion | Weight % solid dry content, of the total binder content | 0 | 0.42 |
| B Glycol based component | Weight % solid dry content of the total binder content | 0 | 1.38 |
| B Glycol type | — | — | Hexylene |
| C water retention component | Weight % solid dry content, of the total binder content | 0 | 0 |
| Water retention type | — | — | — |
| D rheology modifier | Weight % solid dry content, of the total binder content | 0 | 0.0015 |
| D rheology modifier type | — | — | acrylic acid |
| Sand | kg/m³ of castable material | 1050 | 1050 |
| Fine aggregates gravel 2/8 round | kg/m³ of castable material | 613 | 624 |
| Coarse aggregates gravel 8/16 round | kg/m³ of castable material | 0 | 0 |

Results

| Measurement | Unit | Value | Value |
|---|---|---|---|
| Slump flow | mm | 230 | 220 |
| Strength at 28 days | Mpa | 27.53 | 26.15 |
| Restrained shrinkage Ring (time of crack) | days | 7 | >28 |
| Plastic shrinkage cracks/width in mm | —/mm | YES/0.5 | NO/— |

Example 8: Mortar Formulation with and without Internal Curing System in a Formulated Admixture (Component A, B, C and D Added Jointly)

| EXAMPLE 8 | | | |
|---|---|---|---|
| Material | Unit | Reference 8-1 | Example 8-1 |
| Cement | kg/m³ of castable material | 450 | 450 |
| Cement Type | — | Type I | Type I |
| Fly ash content | kg/m³ of castable material | 0 | 0 |
| Total binder | kg/m³ of castable material | 450 | 450 |
| Total water | kg/m³ of castable material | 199 | 199 |
| w/b | Kg/Kg of total binder per m³ of castable material | 0.44 | 0.44 |
| Volume of paste | Liters/m³ of castable material | 341 | 341 |
| Plasticizers/superplasticizers | Weight % solid dry content of the total binder content | 1.1 | 1.3 |
| A paraffin based wax emulsion | Weight % solid dry content, of the total binder content | 0 | 0.26 |
| B Glycol based component | Weight % solid dry content of the total binder content | 0 | 0.53 |
| B Glycol type | — | — | Hexylene |
| C water retention component | Weight % solid dry content, of the total binder content | 0 | 0.53 |
| Water retention type | — | — | Polysaccharide |
| D rheology modifier | Weight % solid dry content, of the total binder content | 0 | 0.0005 |
| D rheology modifier type | — | — | acrylic acid |
| Sand | kg/m³ of castable material | 1350 | 1350 |
| Fine aggregates gravel 2/8 round | kg/m³ of castable material | 0 | 0 |
| Coarse aggregates gravel 8/16 round | kg/m³ of castable material | 0 | 0 |
| Results | | | |
| Measurement | Unit | Value | Value |
| Slump flow | mm | 160 | 160 |
| Restrained shrinkage Ring (time of crack) | hours | 25 | 73 |
| Plastic shrinkage cracks/width in mm | —/mm | YES/0.5 | NO/— |

Example 9: Concrete Formulation with and without Internal Curing System (Components A, B, C and D) Added Jointly to the Castable Cement Based Material)

| EXAMPLE 9 | | | |
|---|---|---|---|
| Material | Unit | Reference 9-1 | Example 9-1 |
| Cement | kg/m³ of castable material | 230 | 230 |
| Cement Type | — | Type II | Type II |
| Fly ash content | kg/m³ of castable material | 110 | 110 |
| Total binder content | kg/m³ of castable material | 340 | 340 |
| Total water | kg/m³ of castable material | 183 | 184 |
| w/b | Kg/Kg of total binder per m³ of castable material | 0.54 | 0.54 |
| Volume of paste | Liters/m³ of castable material | 360 | 360 |
| Plasticizers/superplasticizers | Weight % solid dry content of the total binder content | 0.88 | 1.39 |
| Other | Weight % solid dry content of the total binder content | 0 | 0 |
| A paraffin based wax emulsion | Weight % solid dry content, of the total binder content | 0 | 0.3 |
| B Glycol based component | Weight % solid dry content, of the total binder content | 0 | 1.07 |
| B Glycol type | — | — | Hexylene |
| C water retention component | Weight % solid dry content, of the total binder content | 0 | 0.014 |
| Water retention type | — | — | polysaccharide |

-continued

| EXAMPLE 9 | | | |
|---|---|---|---|
| D rheology modifier | Weight % solid dry content, of the total binder content | 0 | 0.0006 |
| D rheology modifier type | — | — | acrylic acid |
| Sand | kg/m³ of castable material | 924 | 922 |
| Fine aggregates gravel 2/8 round | kg/m³ of castable material | 398 | 398 |
| Coarse aggregates gravel 8/16 round | kg/m³ of castable material | 488 | 488 |

| Results | | | |
|---|---|---|---|
| Measurement | Unit | Value | Value |
| Restrained shrinkage Ring (time of crack) | days | 6 | 15 |
| Plastic shrinkage crack test | Presence of cracks/crack width (mm) | YES/2 | NO/— |

Example 10: Concrete Formulation with and without Internal Curing System (Components A, B, C and D) Added Jointly to the Castable Cement Based Material)

| Example 10 | | | |
|---|---|---|---|
| Material | Unit | Reference 10-1 | Example 10-1 |
| Cement | kg/m³ of castable material | 290 | 290 |
| Cement Type | — | Type I | Type I |
| Inert filler | kg/m³ of castable material | 120 | 120 |
| Type of filler | — | microsilica | microsilica |
| Total binder | kg/m³ of castable material | 290 | 290 |
| Total water | kg/m³ of castable material | 205 | 205 |
| w/b | Kg/Kg of total binder per m³ of castable material | 0.71 | 0.71 |
| Volume of paste | Liters/m³ of castable material | 341 | 341 |
| Plasticizers/superplasticizers | Weight % solid dry content of the total binder content | 1.53 | 1.53 |
| A paraffin based wax emulsion | Weight % solid dry content, of the total binder content | 0 | 0.4 |
| B Glycol based component | Weight % solid dry content of the total binder content | 0 | 1.39 |
| B Glycol type | — | — | Hexylene |
| C water retention component | Weight % solid dry content, of the total binder content | 0 | 0.018 |
| Water retention type | — | — | polysaccharide |
| D rheology modifier | Weight % solid dry content, of the total binder content | 0 | 0.0008 |
| D rheology modifier type | — | — | acrylic acid |
| Sand | kg/m³ of castable material | 836 | 813 |
| Fine aggregates gravel 4/10 round | kg/m³ of castable material | 846 | 823 |
| Coarse aggregates gravel 8/16 round | kg/m³ of castable material | 0 | 0 |

| Results | | | |
|---|---|---|---|
| Measurement | Unit | Value | Value |
| Slump flow/Class | mm/— | 720/SF2 | 690/SF2 |
| Restrained shrinkage Ring (time of crack) | Days | 14 | >28 |
| Plastic shrinkage crack test | Presence of cracks/crack width (mm) | YES/1 | YES/0.1 |

It can be seen from the various examples of mix designs for mortars, screeds and concrete that the castable cement based material according to some embodiments all show shrinkage resistances and cracking resistance that are much higher than the respective same castable cement based material that does not contain the internal curing system (examples 1-10).

Example 7 evidences that a screed formulation according to some embodiments (example 7-1) and containing polypropylene fibers that are known to enhance the cracking resistance is having a substantial shrinkage crack resistance enhancement with respect to the same screed mix design containing the same amount of polypropylene fibers without the internal curing system (reference 7.1).

Some embodiments enable the production of shrinkage and shrinkage crack resistance castable material based on cement and to avoid either complicated chemicals that would have detrimental influence on either the final strength, the consistency the workability retention of the setting time of such material.

Also, some embodiments reduce or eliminate the need for all surface post treatment (sealing, covers, spraying), which are production ineffective, delay the job site and represent a significant cost.

Furthermore, the robustness of some embodiments enables the obtainment of an internal curing system in a formulated admixture that can be transported and stored, enabling to dose all ingredients of the internal curing system from just one container, using one single dosing system and pump.

The invention claimed is:

1. A castable cement based material with enhanced shrinkage resistance, comprising:
   a Portland cement based binder in an amount of at east 290 kg per cubic meters of fresh castable cement based material;
   sand having a particle size less than 3 mm in diameter in an amount of between 500 Kg and 1600 Kg per cubic meters of fresh castable cement based material;
   water;
   a water/total binder ratio in weight located between 0.25 and 0.7;
   an internal curing system;
   a volume of paste in an amount of at east 300 l per cubic meters of fresh castable cement based material; and
   fine aggregates having a particle size greater than 3 mm and less than 10 mm in diameter or/and coarse aggregates; wherein:
   the internal curing system is in an amount of between 2 g to 30 g (dry solid content)/liter with respect to the total volume of paste;
   the internal curing system contains at least a wax emulsion (A) in an amount in dry solid content with respect to the total binder content between 0.04 weight % to 1.35 weight %, and hexylene glycol (B) in an amount in dry solid content with respect to the total binder content is between 0.1 weight % to 3 weight %; and
   the dry solid content ratio between the wax emulsion (A) and the hexylene glycol (B) in weight is between 0.2 and 1.0.

2. The castable cement based material according to claim 1, wherein the internal curing system further contains a water retention agent (C) and/or a rheology modifier (D).

3. The castable cement based material according to claim 2, wherein the water retention agent and/or rheology modifier is chosen from polysaccharides or polymers of acrylic acid.

4. The castable cement based material according to claim 2, wherein the water retention agent (C) is a polysaccharide.

5. The castable cement based material according to claim 2, wherein the rheology modifier (D) is chosen from at least one of acrylic acid, polyethylene, alkylene oxide polymers and its esters.

6. The castable cement based material according to claim 2, wherein the amount of the water retention agent (C) in dry solid content with respect to the total binder content is located between 0.0025 weight % to 0.20 weight %.

7. The castable cement based material according to claim 2, wherein the amount of the rheology modifier (D) in dry solid content with respect to the total binder content is located between 0.000075 weight % to 0.01 weight % (for rheology modifier being an acrylic acid) or 0.0005 weight % to 0.02 weight % (for rheology modifier being a polysaccharide).

8. The castable cement based material according to claim 3, wherein the water retention agent (C) is a polysaccharide.

9. The castable cement based material according to claim 3, wherein the amount of the water retention agent (C) in dry solid content with respect to the total binder content is located between 0.0025 weight % to 0.20 weight %.

10. The castable cement based material according to claim 4, wherein the amount of the water retention agent (C) in dry solid content with respect to the total binder content is located between 0.0025 weight % to 0.20 weight %.

11. The castable cement based material according to claim 5, wherein the amount of the water retention agent (C) in dry solid content with respect to the total binder content is located between 0.0025 weight % to 0.20 weight %.

12. The castable cement based material according to claim 3, wherein the amount of the rheology modifier (D) in dry solid content with respect to the total binder content is located between 0.000075 weight % to 0.01 weight % (for rheology modifier being an acrylic acid) or 0.0005 weight % to 0.02 weight % (for rheology modifier being a polysaccharide).

13. A method of producing a castable cement based material as defined in claim 2, the method comprising:
   adding, separately from each other, wax emulsion (A), glycol-based shrinkage reducing agent (B), and water retention agent (C) and/or rheology modifier (D); and
   performing the adding before, during or after mixing of the other components of the castable cement based material.

14. The method according to claim 13, further comprising the steps of mixing wax emulsion (A), glycol-based shrinkage reducing agent (B), rheology modifier (D) and water retention agent (C) in an admixture, and adding the admixture to other components of the castable cement based material.

15. The method according to claim 14, wherein the component D has a dosage (dry solid content) ranking from 0.015% to 0.2% in weight of the admixture containing all the other components A, B, water and C.

16. The method according to claim 14, wherein the dry solid content ratio between components A and component B in weight is typically located between 0.2 and 1.0.

* * * * *